US009437905B2

(12) United States Patent
Boddakayala et al.

(10) Patent No.: US 9,437,905 B2
(45) Date of Patent: Sep. 6, 2016

(54) TRACTION BATTERY THERMAL PLATE MANIFOLD

(71) Applicant: Ford Global Technologies, LLC, Dearborn, MI (US)

(72) Inventors: Bhaskara Boddakayala, Canton, MI (US); Neil Robert Burrows, White Lake Township, MI (US); Saravanan Paramasivam, South Lyon, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 334 days.

(21) Appl. No.: 14/189,078

(22) Filed: Feb. 25, 2014

(65) Prior Publication Data
US 2015/0244044 A1   Aug. 27, 2015

(51) Int. Cl.
*H01M 2/10* (2006.01)
*H01M 10/02* (2006.01)
*H01M 10/12* (2006.01)
*H01M 10/6556* (2014.01)
*H01M 10/613* (2014.01)
*H01M 10/625* (2014.01)
*B60L 11/14* (2006.01)
*B60L 11/18* (2006.01)
*H01M 10/6568* (2014.01)
*H01M 10/6566* (2014.01)

(52) U.S. Cl.
CPC .......... *H01M 10/6556* (2015.04); *B60L 11/14* (2013.01); *B60L 11/1803* (2013.01); *B60L 11/1874* (2013.01); *B60L 11/1875* (2013.01); *B60L 11/1879* (2013.01); *H01M 10/613* (2015.04); *H01M 10/625* (2015.04); *B60L 2240/545* (2013.01); *H01M 10/6566* (2015.04); *H01M 10/6568* (2015.04); *H01M 2220/20* (2013.01); *Y02T 10/70* (2013.01); *Y02T 10/7005* (2013.01); *Y02T 10/705* (2013.01); *Y02T 10/7077* (2013.01)

(58) Field of Classification Search
CPC ........... H01M 10/613; H01M 10/625; H01M 10/6556; H01M 10/6557; H01M 2/1077
See application file for complete search history.

(56) References Cited

U.S. PATENT DOCUMENTS

| 6,586,132 | B1 | 7/2003 | Fukuda et al. | |
|---|---|---|---|---|
| 7,795,845 | B2 | 9/2010 | Cho | |
| 8,427,832 | B2 | 4/2013 | Dede et al. | |
| 2006/0132101 | A1* | 6/2006 | Ambrosio | B60L 11/1855 320/150 |
| 2008/0280192 | A1* | 11/2008 | Drozdz | B60K 6/28 429/62 |
| 2010/0092849 | A1* | 4/2010 | Wood | H01M 2/1072 429/99 |

(Continued)

FOREIGN PATENT DOCUMENTS

WO   2012013789 A1   2/2012

*Primary Examiner* — Kenneth Douyette
(74) *Attorney, Agent, or Firm* — David B. Kelley; Brooks Kushman P.C.

(57) ABSTRACT

A traction battery system for a vehicle is provided. The system may include a plurality of battery cells, a thermal plate, and an inlet manifold. The thermal plate may support the battery cells and includes a heat exchange region and two lateral sides defining two planes. The inlet manifold may be positioned downstream of an inlet port and upstream of the heat exchange region. The inlet manifold may define distribution channels throughout the inlet manifold and includes an outlet to the heat exchange region having a cross-sectional area defining a third plane. The two planes and third plane define a region normal to the cross sectional area and the inlet manifold may be positioned such that the inlet port is located outside the region.

13 Claims, 11 Drawing Sheets

(56) References Cited

U.S. PATENT DOCUMENTS

| | | | |
|---|---|---|---|
| 2011/0111272 A1* | 5/2011 | Yang | B60L 3/0046 |
| | | | 429/62 |
| 2011/0244298 A1 | 10/2011 | Guener et al. | |
| 2012/0031598 A1 | 2/2012 | Han et al. | |
| 2012/0148889 A1 | 6/2012 | Fuhr et al. | |
| 2012/0170222 A1* | 7/2012 | Dede | F28F 3/083 |
| | | | 361/702 |
| 2012/0177972 A1* | 7/2012 | Lai | H01M 2/22 |
| | | | 429/120 |

* cited by examiner

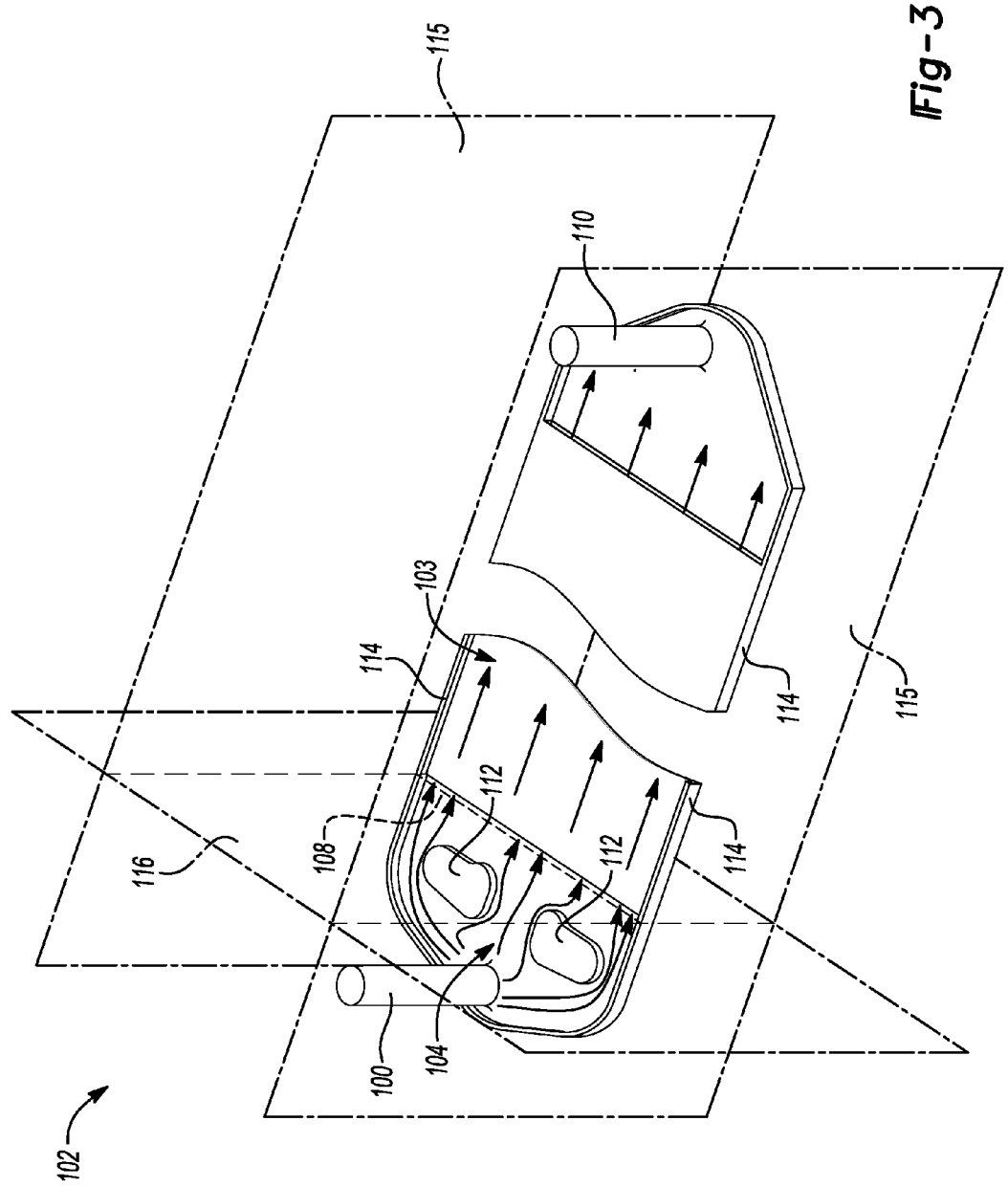

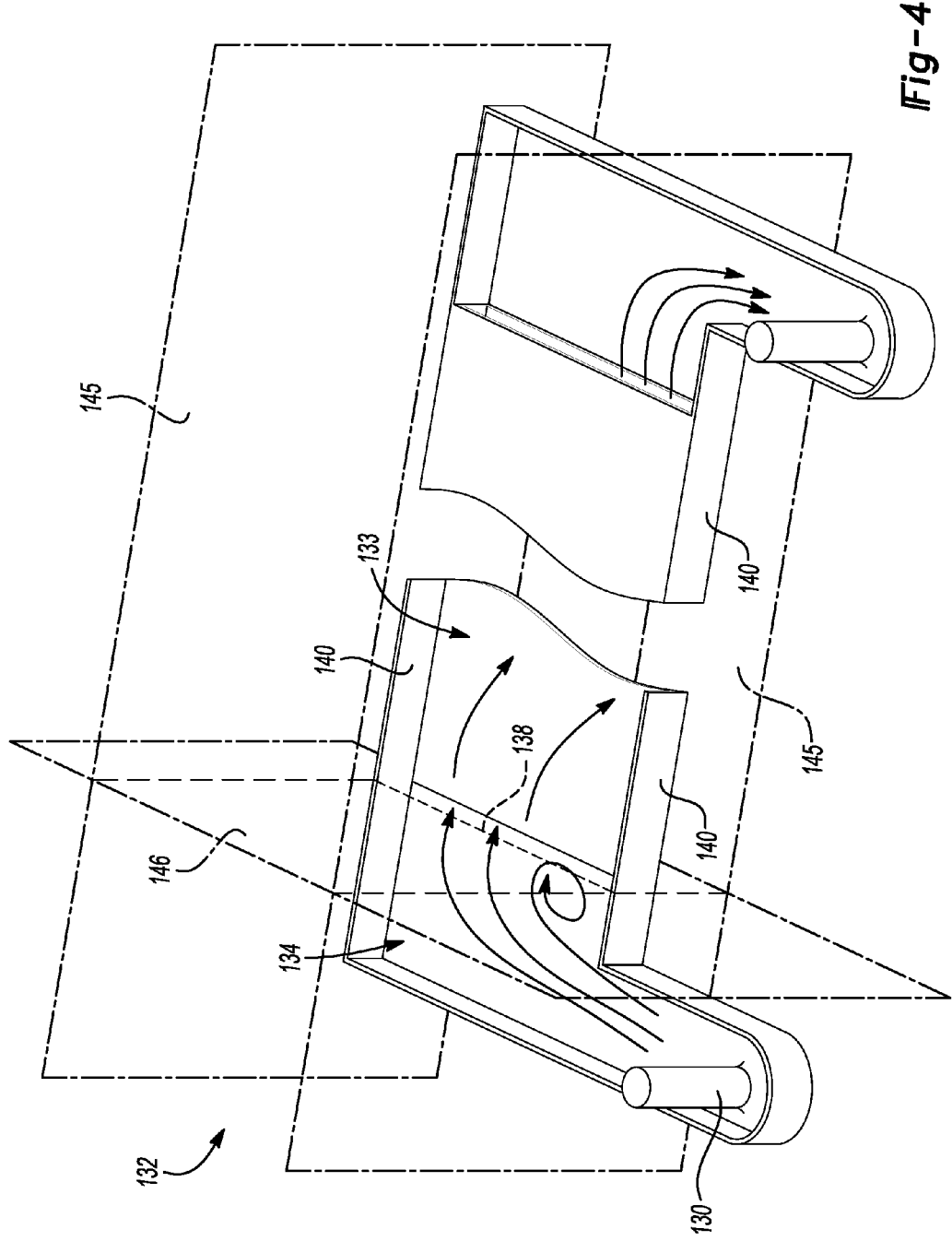

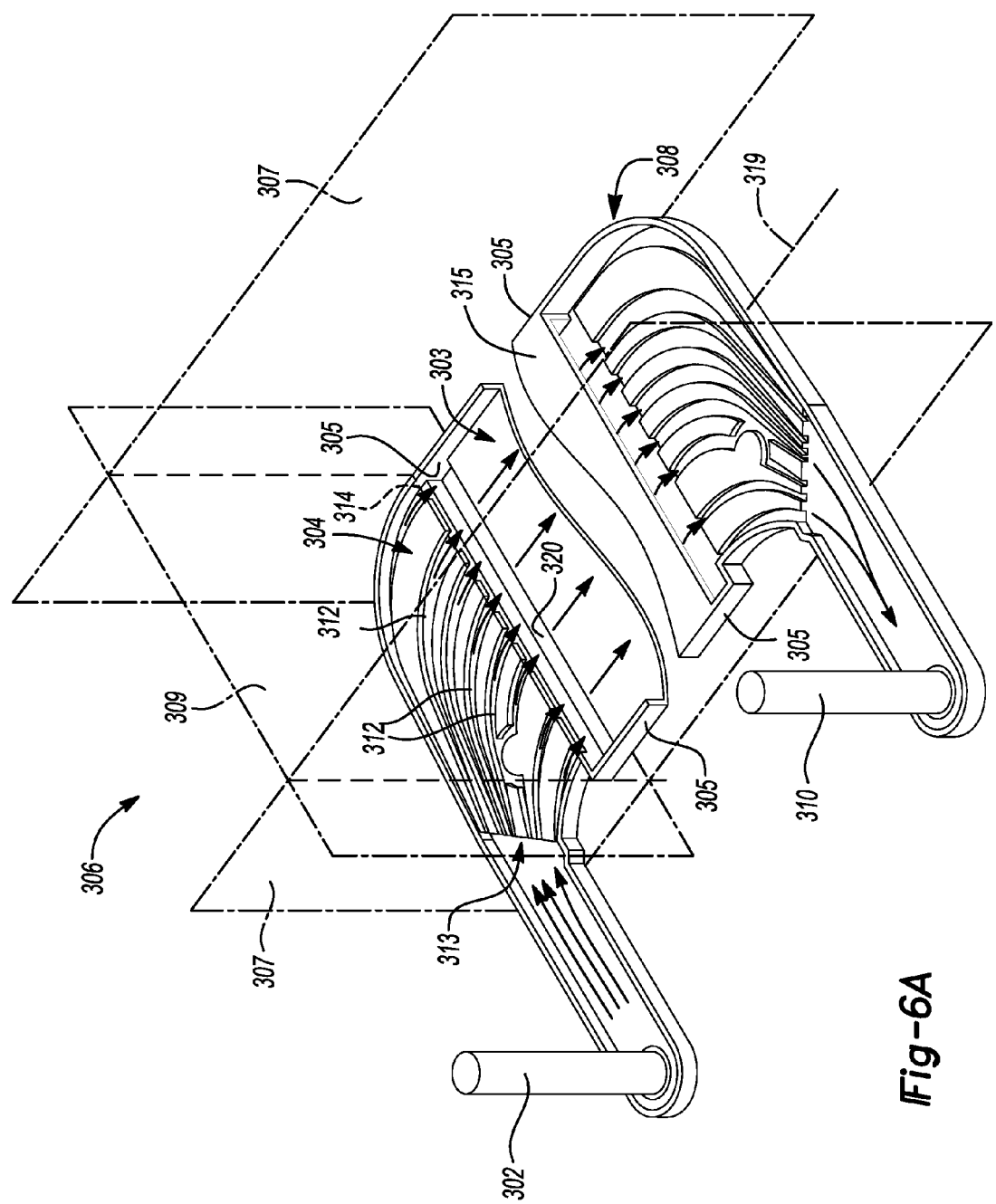

TRACTION BATTERY THERMAL PLATE MANIFOLD

TECHNICAL FIELD

This disclosure relates to thermal management systems for high voltage batteries utilized in vehicles.

BACKGROUND

Vehicles such as battery-electric vehicles (BEVs), plug-in hybrid-electric vehicles (PHEVs) or full hybrid-electric vehicles (FHEVs) contain a traction battery, such as a high voltage ("HV") battery, to act as a propulsion source for the vehicle. The HV battery may include components and systems to assist in managing vehicle performance and operations. The HV battery may include one or more arrays of battery cells interconnected electrically between battery cell terminals and interconnector busbars. The HV battery and surrounding environment may include a thermal management system to assist in regulating temperature of the HV battery components, systems, and individual battery cells.

SUMMARY

A traction battery thermal system includes battery cells, a thermal plate, and an inlet manifold. The thermal plate is configured to direct fluid therethrough and to support the battery cells. The inlet manifold has an inlet and an outlet in fluid communication with a heat exchange region of the thermal plate. The inlet manifold also defines spaced apart fluid distribution channels arranged to disperse fluid across the inlet manifold outlet. The inlet manifold outlet has a cross-sectional area and the inlet manifold inlet is positioned outside a region normal to the cross-sectional area. The distribution channels may be arranged in a plurality of fountain-type patterns extending from the inlet manifold inlet to the inlet manifold outlet and configured to influence fluid flow from a direction substantially perpendicular to a longitudinal axis of the thermal plate to a direction substantially parallel to the longitudinal axis of the thermal plate. The distribution channels may be configured to redirect fluid flow from the inlet manifold inlet in a direction substantially perpendicular to a longitudinal axis of the thermal plate to a direction substantially parallel with the longitudinal axis of the thermal plate. The thermal system may also include an outlet manifold in fluid communication with the heat exchange region. The inlet manifold, thermal plate, outlet manifold, and a lower portion of a battery tray may be die cast or stamped as a single component. The heat exchange region may further define a trough positioned downstream of the inlet manifold outlet and configured to receive fluid from the inlet manifold outlet.

A traction battery system includes a plurality of battery cells, a thermal plate, and an inlet manifold. The thermal plate has a heat exchange region and lateral sides defining two planes. The thermal plate is configured to support the battery cells and to direct fluid through the thermal plate. The inlet manifold includes an inlet and an outlet in fluid communication with the heat exchange region. The inlet manifold outlet has a cross-sectional area defining a third plane. The inlet manifold defines spaced apart fluid distribution channels arranged to disperse fluid across the inlet manifold outlet. The two planes and the third plane define a region normal to the cross sectional area. The inlet manifold inlet is positioned outside of the region normal to the cross sectional area. The fluid distribution channels may include extrusions spaced apart from one another and arranged in a plurality of curved fountain-type patterns extending from the inlet manifold inlet to the outlet. The fluid distribution channels may be defined by passageways spaced apart from one another and arranged to extend from the inlet manifold inlet to the outlet. The passageways may further define passageway outlets spaced across a width of the inlet manifold outlet. The passageways may be configured to redirect fluid flow from the inlet manifold inlet in a direction substantially perpendicular to a longitudinal axis of the thermal plate to a direction substantially parallel with the longitudinal axis of the thermal plate. The system may also include an outlet manifold in fluid communication with the thermal plate. The inlet manifold, heat exchange region, outlet manifold, and a lower portion of a battery tray may be die cast or stamped as a single component. The thermal plate may also define a trough downstream of the inlet manifold outlet which is configured to receive fluid from the outlet.

A vehicle includes a plurality of battery cells, a thermal plate, and an inlet manifold. The thermal plate supports the battery cells and includes a heat exchange region and two lateral sides defining two planes. The inlet manifold is positioned downstream of an inlet port and upstream of the heat exchange region. The inlet manifold defines extrusions throughout the inlet manifold and includes an outlet to the heat exchange region having a cross-sectional area defining a third plane. The two planes and the third plane define a region normal to the cross sectional area and the inlet manifold is positioned such that the inlet port is located outside the region. The extrusions may be arranged in a plurality of fountain-type patterns extending throughout the inlet manifold to the inlet manifold outlet and configured to influence fluid flow from a direction substantially perpendicular to a longitudinal axis of the thermal plate to a direction substantially parallel to the longitudinal axis of the thermal plate. A portion of each extrusion may define a surface area sized such that another surface may be brazed thereto. The vehicle may also include a thermal plate outlet manifold in fluid communication with the heat exchange region. The inlet manifold, thermal plate, outlet manifold, and a bottom portion of a battery tray may be die cast as a single component. An upper portion of the battery tray may be die cast in a configuration to mate with the single component. The thermal plate may define a trough proximate to the outlet of the inlet manifold and be configured to receive fluid from the outlet.

BRIEF DESCRIPTION OF THE DRAWINGS

FIG. 3 is a perspective view of a portion of a thermal management system of a traction battery.

FIG. 4 is a perspective view of a portion of a thermal management system of a traction battery.

FIG. 6A is a perspective view of a portion of a thermal management system of a traction battery.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
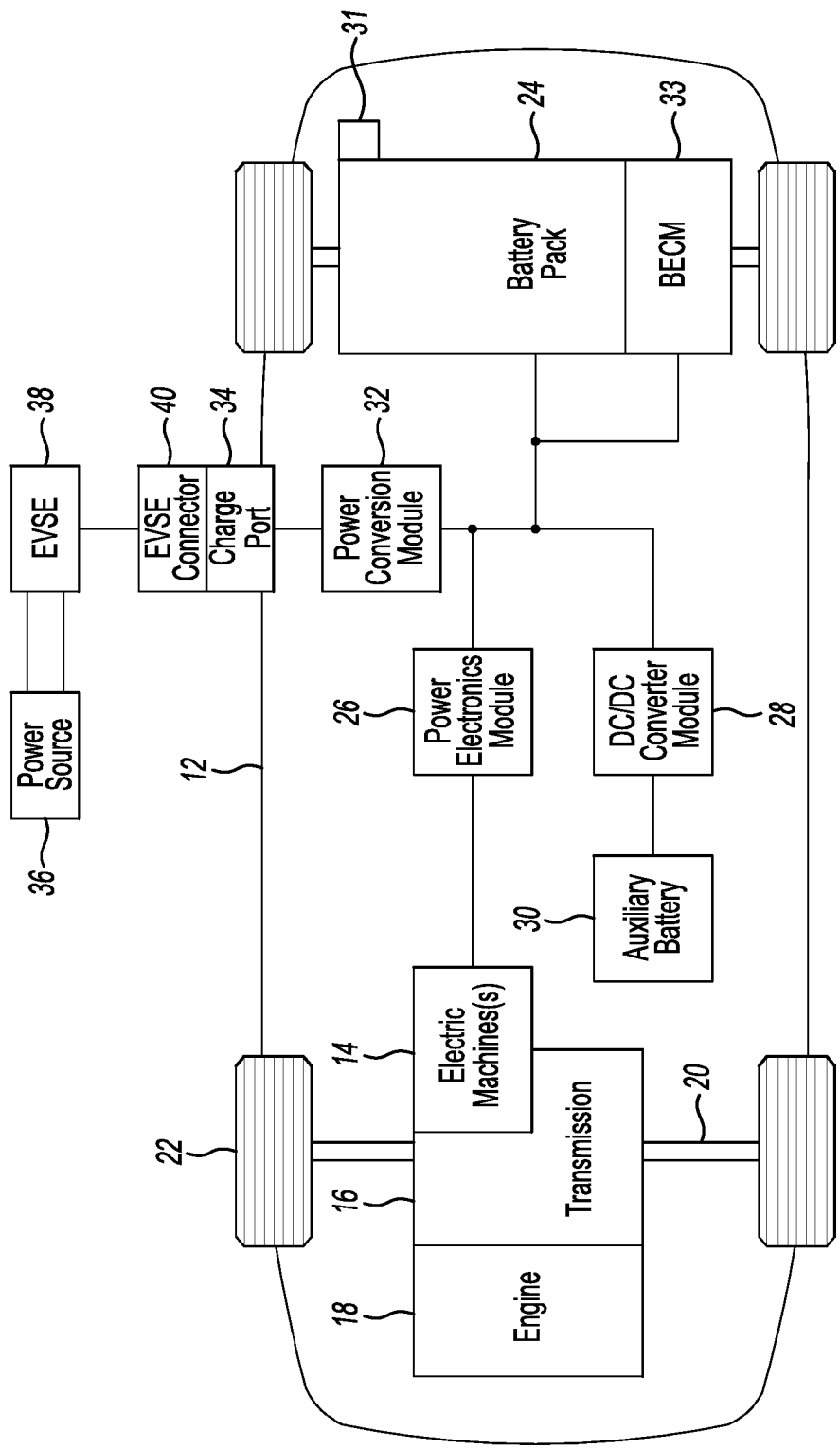
FIG. 1 is a schematic illustration of a battery electric vehicle.

FIG. 1 depicts a schematic of a typical plug-in hybrid-electric vehicle (PHEV). A typical plug-in hybrid-electric vehicle 12 may comprise one or more electric machines 14 mechanically connected to a hybrid transmission 16. The electric machines 14 may be capable of operating as a motor or a generator. In addition, the hybrid transmission 16 is mechanically connected to an engine 18. The hybrid transmission 16 is also mechanically connected to a drive shaft 20 that is mechanically connected to the wheels 22. The electric machines 14 can provide propulsion and deceleration capability when the engine 18 is turned on or off. The electric machines 14 also act as generators and can provide fuel economy benefits by recovering energy that would normally be lost as heat in the friction braking system. The electric machines 14 may also provide reduced pollutant emissions since the hybrid-electric vehicle 12 may be operated in electric mode under certain conditions.

A traction battery or battery pack 24 stores energy that can be used by the electric machines 14. The traction battery 24 typically provides a high voltage DC output from one or more battery cell arrays, sometimes referred to as battery cell stacks, within the traction battery 24. The battery cell arrays may include one or more battery cells. The traction battery 24 is electrically connected to one or more power electronics modules 26 through one or more contactors (not shown). The one or more contactors isolate the traction battery 24 from other components when opened and connect the traction battery 24 to other components when closed.

The power electronics module 26 is also electrically connected to the electric machines 14 and provides the ability to bi-directionally transfer electrical energy between the traction battery 24 and the electric machines 14. For example, a typical traction battery 24 may provide a DC voltage while the electric machines 14 may require a three-phase AC voltage to function. The power electronics module 26 may convert the DC voltage to a three-phase AC voltage as required by the electric machines 14. In a regenerative mode, the power electronics module 26 may convert the three-phase AC voltage from the electric machines 14 acting as generators to the DC voltage required by the traction battery 24. The description herein is equally applicable to a pure electric vehicle. For a pure electric vehicle, the hybrid transmission 16 may be a gear box connected to an electric machine 14 and the engine 18 may not be present.

In addition to providing energy for propulsion, the traction battery 24 may provide energy for other vehicle electrical systems. A typical system may include a DC/DC converter module 28 that converts the high voltage DC output of the traction battery 24 to a low voltage DC supply that is compatible with other vehicle loads. Other high-voltage loads, such as compressors and electric heaters, may be connected directly to the high-voltage without the use of a DC/DC converter module 28. In a typical vehicle, the low-voltage systems are electrically connected to an auxiliary battery 30 (e.g., 12V battery).

A battery electrical control module (BECM) 33 may be in communication with the traction battery 24. The BECM 33 may act as a controller for the traction battery 24 and may also include an electronic monitoring system that manages temperature and charge state of each of the battery cells. The traction battery 24 may have a temperature sensor 31 such as a thermistor or other temperature gauge. The temperature sensor 31 may be in communication with the BECM 33 to provide temperature data regarding the traction battery 24.

The vehicle 12 may be, for example, an electric vehicle such as a plug-in hybrid vehicle, or a battery-electric vehicle in which the traction battery 24 may be recharged by an external power source 36. The external power source 36 may be a connection to an electrical outlet. The external power source 36 may be electrically connected to electric vehicle supply equipment (EVSE) 38. The EVSE 38 may provide circuitry and controls to regulate and manage the transfer of electrical energy between the power source 36 and the vehicle 12. The external power source 36 may provide DC or AC electric power to the EVSE 38. The EVSE 38 may have a charge connector 40 for plugging into a charge port 34 of the vehicle 12. The charge port 34 may be any type of port configured to transfer power from the EVSE 38 to the vehicle 12. The charge port 34 may be electrically connected to a charger or on-board power conversion module 32. The power conversion module 32 may condition the power supplied from the EVSE 38 to provide the proper voltage and current levels to the traction battery 24. The power conversion module 32 may interface with the EVSE 38 to coordinate the delivery of power to the vehicle 12. The EVSE connector 40 may have pins that mate with corresponding recesses of the charge port 34.

The various components discussed may have one or more associated controllers to control and monitor the operation of the components. The controllers may communicate via a serial bus (e.g., Controller Area Network (CAN)) or via discrete conductors.

The battery cells, such as a prismatic cell, may include electrochemical cells that convert stored chemical energy to electrical energy. Prismatic cells may include a housing, a positive electrode (cathode) and a negative electrode (anode). An electrolyte may allow ions to move between the anode and cathode during discharge, and then return during recharge. Terminals may allow current to flow out of the cell for use by the vehicle. When positioned in an array with multiple battery cells, the terminals of each battery cell may be aligned with opposing terminals (positive and negative) adjacent to one another and a busbar may assist in facilitating a series connection between the multiple battery cells. The battery cells may also be arranged in parallel such that similar terminals (positive and positive or negative and negative) are adjacent to one another. For example, two battery cells may be arranged with positive terminals adjacent to one another, and the next two cells may be arranged with negative terminals adjacent to one another. In this example, the busbar may contact terminals of all four cells.

The traction battery 24 may be heated and/or cooled using a liquid thermal management system, an air thermal management system, or other method as known in the art. In one example of a liquid thermal management system and now referring to FIG. 2, the traction battery 24 may include a battery cell array 88 shown supported by a thermal plate 90 to be heated and/or cooled by a thermal management system. The battery cell array 88 may include a plurality of battery cells 92 positioned adjacent to one another. The DC/DC converter module 28 and BECM 33 may also require cooling and/or heating under certain operating conditions. A thermal plate 91 may support the DC/DC converter module 28 and BECM 33 and assist in thermal management thereof. For example, the DC/DC converter module 28 may generate heat during voltage conversion which may need to be dissipated. Alternatively, thermal plates 90 and 91 may be in fluid communication with one another to share a common fluid inlet port and common outlet port.

In one example, the battery cell array 88 may be mounted to the thermal plate 90 such that only one surface, of each of the battery cells 92, such as a bottom surface, is in contact with the thermal plate 90. The thermal plate 90 and individual battery cells 92 may transfer heat between one another to assist in managing the thermal conditioning of the battery cell array 88 during vehicle operations. Uniform thermal fluid distribution and high heat transfer capability are two thermal plate 90 considerations for providing effective thermal management of the battery cell arrays 88 and other surrounding components. Since heat transfers between thermal plate 90 and thermal fluid via conduction and convection, the surface area in a thermal fluid flow field is important for effective heat transfer, both for removing heat and for preheating the battery cells 92 at cold temperatures. For example, charging and discharging the battery cells generates heat which may negatively impact performance and life of the battery cell array 88 if not removed. Alternatively, the thermal plate 90 may also provide heat to preheat the battery cell array 88 when subjected to cold temperatures.

Figure 2:
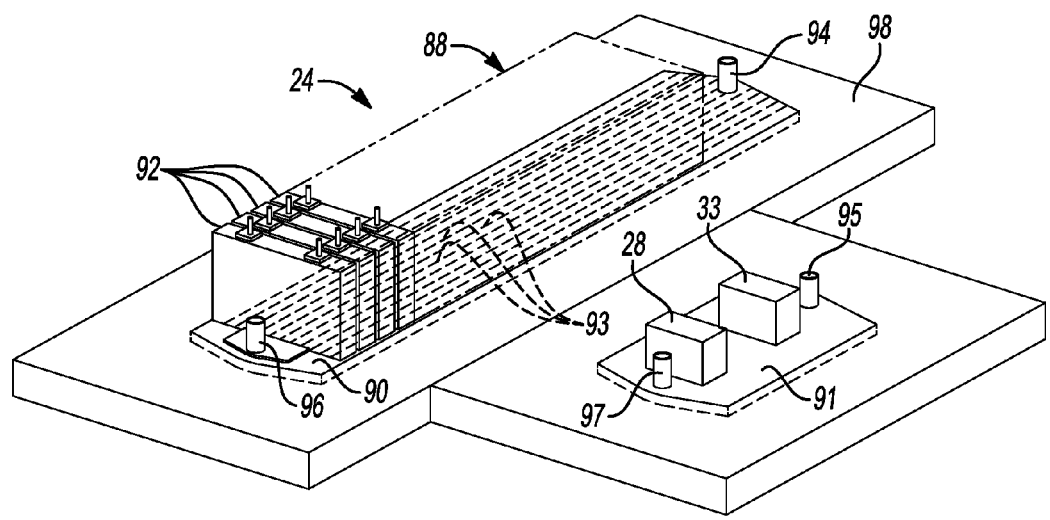
FIG. 2 is a perspective view of a portion of a thermal management system for the traction battery of the vehicle in FIG. 1.

The thermal plate 90 may include one or more channels 93 and/or a cavity to distribute thermal fluid through the thermal plate 90. For example, the thermal plate 90 may include an inlet port 94 and an outlet port 96 that may be in communication with the channels 93 for providing and circulating the thermal fluid. Positioning of the inlet port 94 and outlet port 96 relative to the battery cell arrays 88 may vary. For example and as shown in FIG. 2, the inlet port 94 and outlet port 96 may be centrally positioned relative to the battery cell arrays 88. The inlet port 94 and outlet port 96 may also be positioned to the side of the battery cell arrays 88. Alternatively, the thermal plate 90 may define a cavity (not shown) in communication with the inlet port 94 and outlet port 96 for providing and circulating the thermal fluid. The thermal plate 91 may include an inlet port 95 and an outlet port 97 to deliver and remove thermal fluid. Optionally, a sheet of thermal interface material (not shown) may be applied to the thermal plate 90 and/or 91 below the battery cell array 88 and/or the DC/DC converter module 28 and BECM 33, respectively. The sheet of thermal interface material may enhance heat transfer between the battery cell array 88 and the thermal plate 90 by filling, for example, voids and/or air gaps between the battery cells 92 and the thermal plate 90. The thermal interface material may also provide electrical insulation between the battery cell array 88 and the thermal plate 90. A battery tray 98 may support the thermal plate 90, thermal plate 91, battery cell arrays 88, and other components. The battery tray 98 may include one or more recesses to receive thermal plates.

Different battery pack configurations may be available to address individual vehicle variables including packaging constraints and power requirements. The battery cell arrays 88 may be contained within a cover or housing (not shown) to protect and enclose the battery cell arrays 88 and other surrounding components, such as the DC/DC converter module 28 and the BECM 33. The battery cell arrays 88 may be positioned at several different locations including below a front seat, below a rear seat, or behind the rear seat of the vehicle, for example. However, it is contemplated the battery cell arrays 88 may be positioned at any suitable location in the vehicle 12.

FIG. 3 shows an example of a portion of a traction battery liquid thermal management system in which a centrally located inlet port 100 delivers thermal fluid to a thermal plate 102 via an inlet manifold 104. Reference arrows illustrate a flow path of fluid entering and traveling across the inlet manifold 104, and traveling across the thermal plate 102. The structure of the inlet manifold 104 may assist in delivering a substantially uniform distribution of fluid through a cross-sectional area of an inlet manifold outlet 108 between the inlet manifold 104 and a heat exchange region 103 of the thermal plate 102, resulting in substantially uniform fluid flow across the heat exchange region 103 en route to outlet port 110. The cross-sectional area of the inlet manifold outlet 108 along with the structure of the inlet manifold 104 may be adjusted to provide for different fluid flow velocities across the inlet manifold 104 towards the inlet manifold outlet 108. Additionally, islands 112 may assist in dispersing the fluid flow to different portions of the inlet manifold outlet 108.

The thermal plate 102 may further include two lateral sides 114. The lateral sides 114 may define planes 115 and the cross-sectional area of the inlet manifold outlet 108 may define a plane 116. Two regions may be defined on either side of the plane 116 and between the planes 115. A first region may include the heat exchange region 103 and a second region may include the inlet manifold 104. The second region may also be referred to as a region normal to the cross-sectional area of the inlet manifold outlet 108. As such, the inlet manifold 104 and the inlet port 100 may be considered to be positioned within a region normal to the cross-sectional area of the inlet manifold outlet 108 as shown in FIG. 3.

While the inlet port 100 is centrally located relative to the thermal plate 102 and within a region normal to the cross-sectional area of the inlet manifold outlet 108 in this example, other traction battery system design constraints may require inlet and outlet ports to be positioned in a non-central location relative to the respective thermal plate, and outside a region normal to the cross-sectional area of the respective inlet manifold outlet. This may create additional challenges to deliver uniform fluid flow to respective heat exchange regions since the fluid will transition from a flow path substantially perpendicular to a longitudinal axis of the thermal plate to a flow path which is substantially parallel to a longitudinal axis of the thermal plate.

For example and now referring to FIG. 4, a portion of a liquid thermal management system is shown which may include an inlet port 130 and a thermal plate 132. Thermal fluid from the inlet port 130 may be delivered to a heat exchange region 133 of the thermal plate 132 after passing through a cavity 134. The inlet port 130 may be side mounted relative to the thermal plate 132. Reference arrows illustrate one example of fluid flow from the inlet port 130, through the cavity 134, and across the heat exchange region 133. As shown, distribution of fluid across a cross-sectional area of a cavity outlet 138 is not substantially uniform. Rather, a recirculation of fluid can be seen in one portion of the cavity 134 and other portions of the cavity 134 do not receive any fluid flow at all, resulting in non-uniform flow across the heat exchange region 133 of the thermal plate 132.

The thermal plate 132 may further include two lateral sides 140. The lateral sides 140 may define planes 145 and the cross-sectional area of the cavity outlet 138 may define a plane 146. Two regions may be defined on either side of the plane 146 and between the planes 145. A first region may include the heat exchange region 133 and a second region may include the cavity 134. The second region may also be referred to as a region normal to the cross-sectional area of the cavity outlet 138. As such, the cavity 134 may be considered to be positioned within a region normal to the cross-sectional area of the cavity outlet 138, however, the inlet port 130 may be considered outside of the region normal to a cross-sectional area of the cavity outlet 138. Here, the openness of the cavity 134 results in non-uniform fluid flow across the cavity outlet 138 and the heat exchange region 133. As such, the battery cells (not shown) supported by the thermal plate 132 and/or in contact therewith may be unevenly cooled which may negatively affect the performance and life of the battery cells. In this example, modifications to the cavity 134 may be desired to improve thermal fluid delivery to the heat exchange region 133.

Figure 5B:
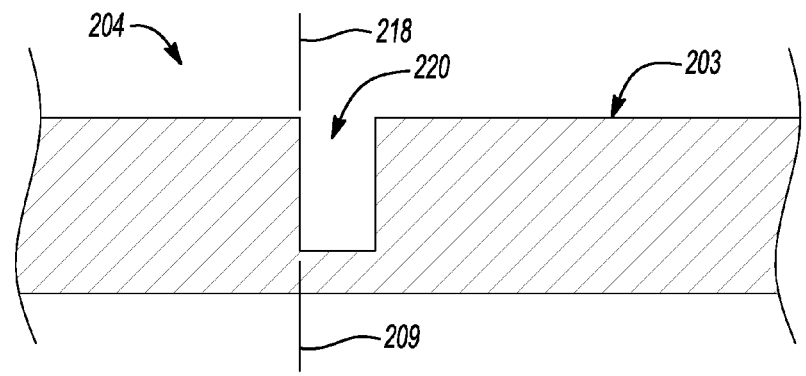
FIG. 5B is a cross-sectional view of a manifold and a thermal plate from the portion of the thermal management system of FIG. 5A.
Figure 5A:
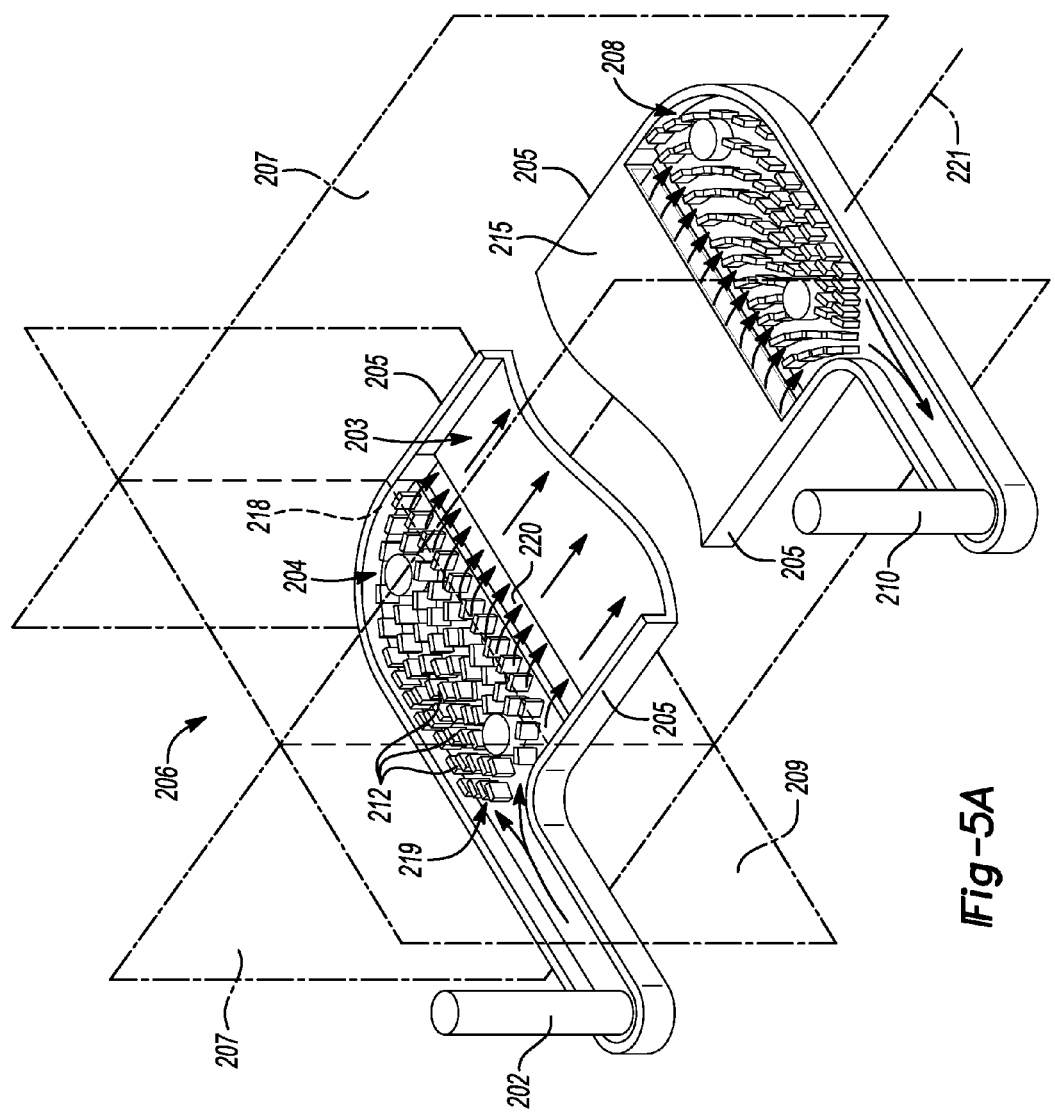
FIG. 5A is a perspective view of a portion of a thermal management system of a traction battery.
Figure 5C:
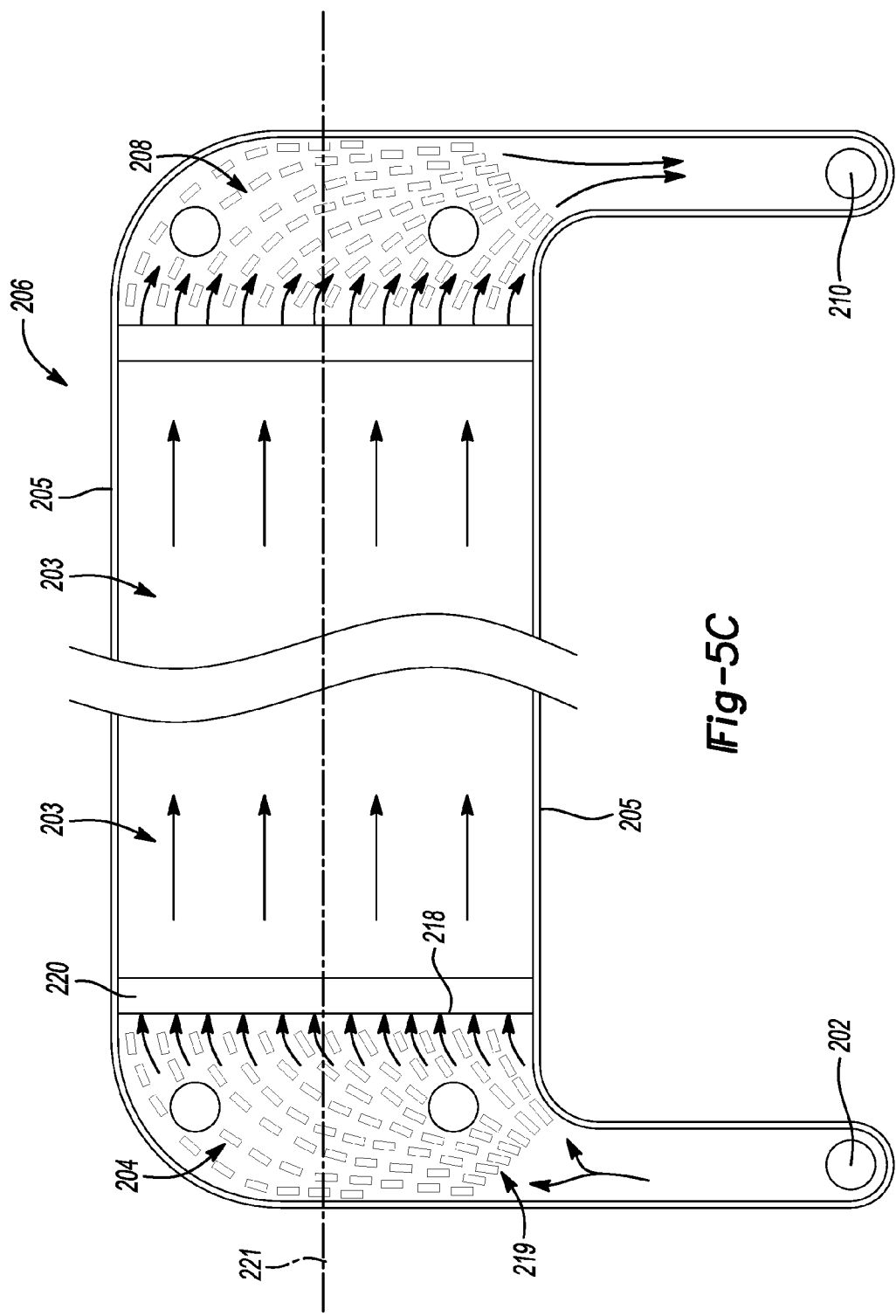
FIG. 5C is a plan view of a manifold and a thermal plate from the portion of the thermal management system of FIG. 5A.

For example and now referring to FIGS. 5A through 5C, an illustrative portion of a liquid thermal management system is shown. The liquid thermal management system may include a thermal plate 206 including an inlet port 202, an inlet manifold 204, a heat exchange region 203, an outlet manifold 208, and an outlet port 210. The inlet port 202 may be side-mounted relative to the thermal plate 206 and deliver thermal fluid to the inlet manifold 204. The inlet manifold 204, the heat exchange region 203, and the outlet manifold 208 may be a single component and may, for example, be cast or stamped as such. The inlet manifold 204 may include an inlet manifold inlet 219 and an inlet manifold outlet 218. The inlet manifold 204 may define extruded portions, such as extrusions or bumps, spaced apart and arranged to define distribution channels therebetween which may disperse the fluid entering the inlet manifold 204. The distribution channels may also assist in defining a predetermined fluid flow rate and/or a predetermined fluid flow velocity to the heat exchange region 203 as described further below.

The thermal plate 206 may further include two lateral sides 205. The lateral sides 205 may define planes 207. A cross-sectional area of the inlet manifold outlet 218 may define a plane 209. Two regions may be defined on either side of the plane 209 and between the planes 207. A first region may include the heat exchange region 203 and a second region may include the inlet manifold 204. The second region may also be referred to as a region normal to the cross-sectional area of the inlet manifold outlet 218. As such, the inlet manifold 204 may be considered to be positioned within a region normal to the cross-sectional area of the inlet manifold outlet 218, and the inlet port 202 may be considered to be outside the region normal to the cross-sectional area of the inlet manifold outlet 218. As described above, the positioning of the inlet port 202 relative to the cross-sectional area of the inlet manifold outlet 218 and thermal plate 206 may present a challenge for thermal fluid delivery to the heat exchange region 203 which may be addressed with distribution channels to assist in influencing fluid flow direction.

One example of the distribution channels includes extrusions 212 which may be defined by the inlet manifold 204. The extrusions 212 may be positioned throughout the inlet manifold 204 to create a plurality of distribution channels therebetween. An upper plate 215 of the thermal plate 206 may be secured to, for example, the extrusions 212, the lateral sides 205, and the outlet manifold 208 (portions of the upper plate 215 are removed in FIG. 5A for illustrative purposes). Alternatively, the extrusions 212 may be defined by the upper plate 215 secured to the thermal plate 206. While multiple methods of securing the upper plate 215 to the bottom portions of the thermal plate 206 are available, one example includes brazing. In this example, the portions of the components which contact one another, such as extrusions 212, lateral sides 205, and upper plate 215, may provide surface area appropriately sized to facilitate the brazing.

Reference arrows in FIG. 5A illustrate one example of flow paths for fluid entering the inlet manifold 204 and the heat exchange region 203. As shown, fluid may disperse throughout the distributions channels defined by the extrusions 212 which may assist in shifting the fluid flow from the inlet port 202, located outside the region normal to the cross-sectional area of the inlet manifold outlet 218, to the heat exchange region 203. These extrusions 212 may increase the fluid velocity to assist in distributing the fluid to the full cross-sectional area of the inlet manifold outlet 218 arranged between the inlet manifold 204 and the heat exchange region 203. As such, fluid may flow at a first velocity across a cross-sectional area of the inlet manifold inlet 219 arranged between the inlet port 202 and the inlet manifold 204, and at a second velocity across a cross-sectional area of the inlet manifold outlet 218.

For example, the extrusions 212 may be arranged in a plurality of curved fountain-type patterns extending from the inlet manifold inlet 219 to the inlet manifold outlet 218 as shown in FIGS. 5A through 5C. The fountain-type patterns of the extrusions 212 may be configured to influence and/or redirect fluid flow from a direction substantially perpendicular to a longitudinal axis 221 of the thermal plate 206 to a direction substantially parallel to the longitudinal axis 221 of the thermal plate 206. As described above, the extrusions 212 may also be secured to the upper plate 215 or may be defined by the upper plate 215 and secured to the inlet manifold 204.

Additionally, the heat exchange region 203 of the thermal plate 206 may define a trough 220 to collect thermal fluid after passing through the inlet manifold outlet 218 to further assist in influencing uniform thermal fluid flow across the heat exchange region 203. For example, thermal fluid may flow through the inlet manifold outlet 218 and "waterfall"

into the trough 220 until enough thermal fluid is present throughout the trough 220 to flow onto the heat exchange region 203. As such, if different portions or amounts of thermal fluid enter the trough 220 at different flow velocities, the trough 220 may assist in influencing a more uniform flow distribution onto the heat exchange region 203.

Figure 6B:
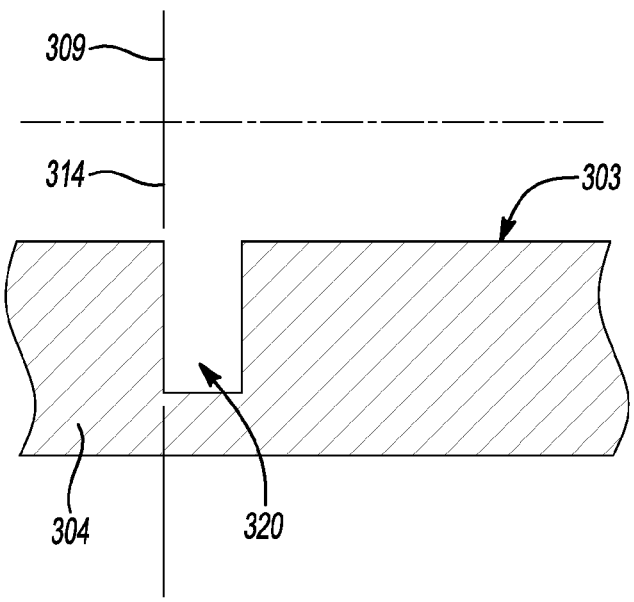
FIG. 6B is a cross-sectional view of a manifold and thermal plate from the portion of the thermal management system of FIG. 6A.
Figure 6C:
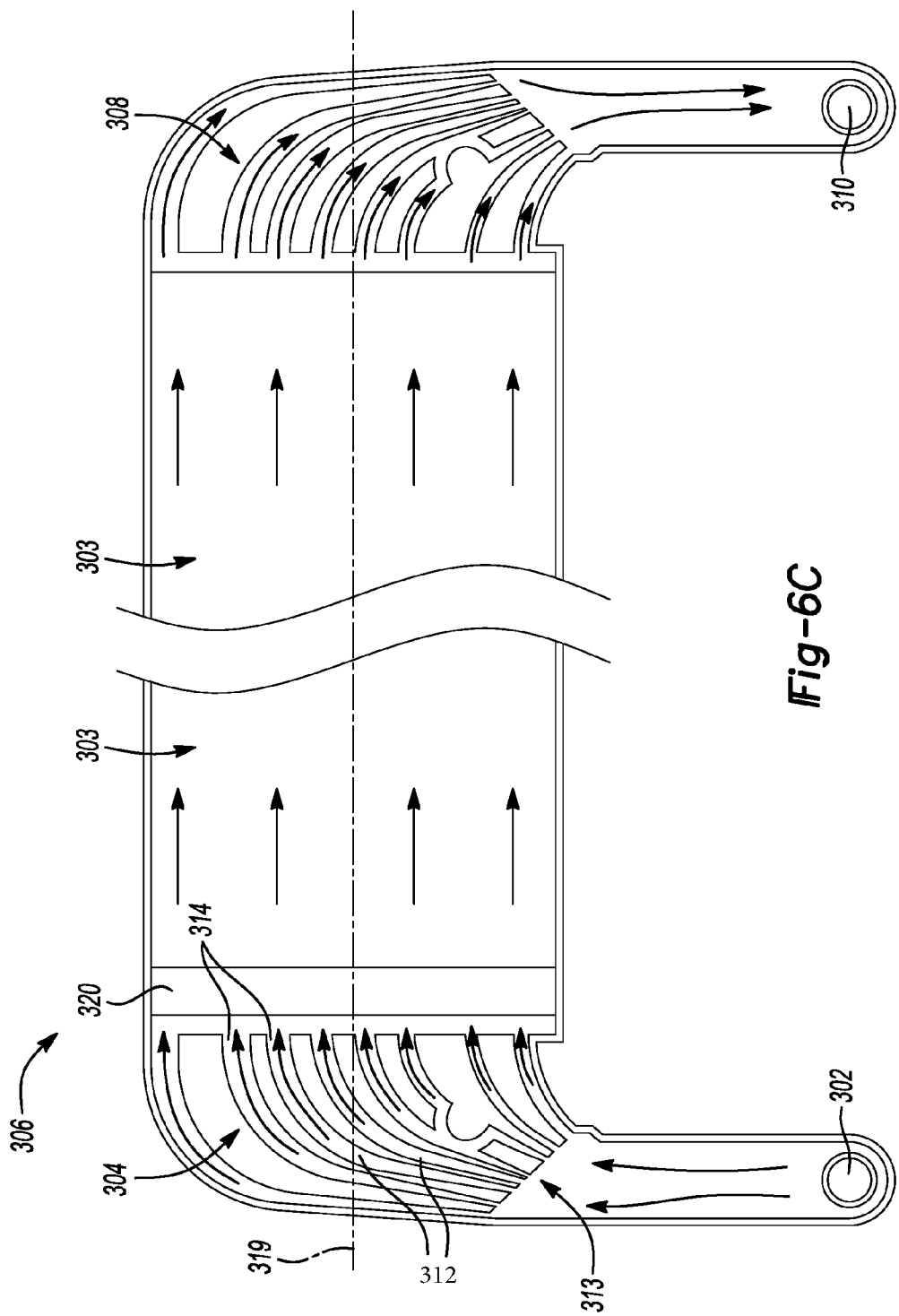
FIG. 6C is a plan view of a manifold and a thermal plate from the portion of the thermal management system of FIG. 6A.

Now referring to FIGS. 6A through 6C, an illustrative portion of another liquid thermal management system is shown. The liquid thermal system may include a thermal plate 306 including an inlet port 302, an inlet manifold 304, a heat exchange region 303, an outlet manifold 308, and an outlet port 310. The inlet port 302 may be side-mounted relative to the thermal plate 306 and deliver thermal fluid to the inlet manifold 304. The inlet manifold 304, the heat exchange region 303, and the outlet manifold 308 may be a single component and may, for example, be cast or stamped as such. The inlet manifold 304 may define passageways, such as passageways 312, spaced apart and arranged to disperse the fluid entering the inlet manifold 304. The passageways 312 may also assist in defining a fluid flow velocity to the heat exchange region 303 as described further below.

The thermal plate 306 may further include two lateral sides 305. The lateral sides 305 may define planes 307 and an effective cross-sectional area of passageway outlets 314 may define a plane 309. Two regions may be defined on either side of the plane 309 and between the planes 307. A first region may include the heat exchange region 303 and a second region may include the inlet manifold 304. The second region may also be referred to as a region normal to the cross-sectional area of the passageway outlets 314. As such, the inlet manifold 304 may be considered to be positioned within a region normal to the cross-sectional area of the passageway outlets 314 and the inlet port 302 may be considered to be outside the region normal to the cross-sectional area of the passageway outlets 314. As described above, the positioning of inlet port 302 relative to the cross-sectional area of the passageway outlets 314 may present a challenge for fluid delivery to the heat exchange region 303 which may be addressed with distribution channels to assist in influencing the direction of fluid flow.

One example of the distribution channels may include the passageways 312. Each passageway 312 may include a passageway inlet 313 and the passageway outlet 314 having respective cross-sectional areas. Walls between the passageways 312 may assist in attaching an upper plate 315 to bottom portions of the thermal plate 306 (portions of the upper plate 315 are removed in FIG. 6A for illustrative purposes). The upper plate 315 may be secured to bottom portions of the thermal plate 306 such as the inlet manifold 304, the walls defining the passageways 312, the lateral sides 305, and the outlet manifold 308. Alternatively, the passageways 312 may be defined by the upper plate 315 and secured to the bottom portions of the thermal plate 306. While multiple methods of securing the upper plate 315 to the bottom portions of the thermal plate 306 are available, one example includes brazing. In this example, the portions of the components which contact one another, such as the walls defining the passageways 312, the lateral sides 305 and the upper plate 315, are sized with an appropriate surface area to facilitate the brazing.

Reference arrows in FIGS. 6A and 6C illustrate one example of fluid flow paths traveling from the inlet port 302, through the inlet manifold 304, across the heat exchange region 303, through the outlet manifold 308, and out the outlet port 310. As shown, fluid may disperse throughout the inlet manifold 304 via the passageways 312 which may assist in shifting the fluid flow from the inlet port 302, outside the region normal to the cross-sectional area of the passageway outlets 314, to the heat exchange region 303. The passageways 312 may also be configured to redirect fluid flow from the inlet port 302 in a direction substantially perpendicular to a longitudinal axis 319 of the thermal plate 306 to a direction substantially parallel with the longitudinal axis 319 of the thermal plate 306. These passageways 312 may also reduce or increase the flow velocity of the coolant fluid by a relationship between predetermined cross-sectional areas of the passageway inlets 313 and passageway outlets 314.

For example, when the cross-sectional area of passageway outlets 314 is greater than the cross-sectional area of passageway inlets 313, the fluid flow velocity across the passageway outlets 314 will be less than the fluid flow velocity at the cross-sectional area of the passageway inlets 313. Further, passageway outlets 314 may be spaced apart and across the width of the heat exchange region 303 to assist in delivering thermal fluid evenly or substantially evenly to the heat exchange region 303. In doing so, the relationship between the cross-sectional areas of the passageway inlets 313 and passageway outlets 314 may deliver a predetermined and substantially uniform fluid flow across the passageway outlets 314 arranged between the inlet manifold 304 and the heat exchange region 303. As such, fluid may flow at a first velocity across the cross-sectional area of the passageway inlets 313, and at a second velocity across the cross-sectional area of the passageway outlets 314.

Additionally, the thermal plate 306 and/or the heat exchange region 303 may define a trough 320 to collect thermal fluid after passing through the passageway outlets 314 to further assist in influencing uniform thermal fluid flow across the heat exchange region 303. For example, thermal fluid may flow through the passageway outlets 314 and waterfall into the trough 320 until enough thermal fluid is present throughout the trough 320 to flow onto the heat exchange region 303. As such, if different portions or amounts of thermal fluid enter the trough 320, the trough 320 may assist in influencing a more uniform flow onto the heat exchange region 303.

Figure 7:
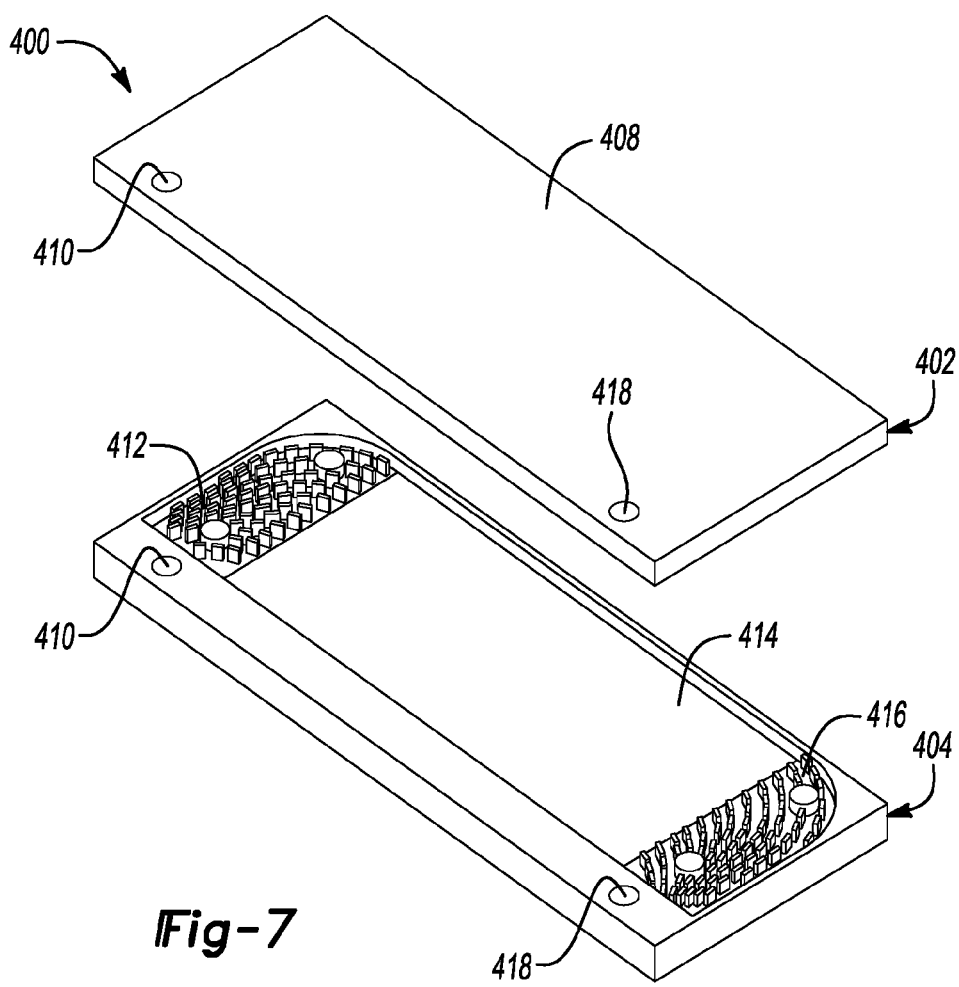
FIG. 7 is a perspective view of a battery cell array support structure.

Integration of components from traction battery thermal management systems may also assist in addressing vehicle packaging constraints. For example, FIG. 7 shows one example of an integration between a battery tray and a thermal plate. Battery support structure 400 may include an upper plate 402 and a lower plate 404. The lower plate 404 may define thermal plate elements such as an inlet port 410, an inlet manifold 412, a heat exchange region 414, an outlet manifold 416, and an outlet port 418. While the inlet port 410 and the outlet port 418 are shown exiting upward from the support structure 400 in FIG. 7, it is contemplated that the inlet port 410 and the outlet port 418 may exit to the side and/or below the support structure 400. The upper plate 402 and lower plate 404 may, for example, be die cast using a high pressure die cast method. The upper plate 402 and the lower plate 404 may be attached to one another with fasteners (not shown) and a gasket (not shown) sealed within the attachment. The upper plate 402 and the lower plate 404 may also be welded or brazed to one another. It is contemplated that other methods of attachment are possible. With each method of attachment, the upper plate 402 and the lower plate 404 are attached to one another such that a thermal fluid flow system, defined by the inlet manifold 412, the heat exchange region 414, and the outlet manifold 416, provides a route for thermal fluid to flow proximate to a battery cell array (not shown) supported by the battery support structure 400.

Figure 8:
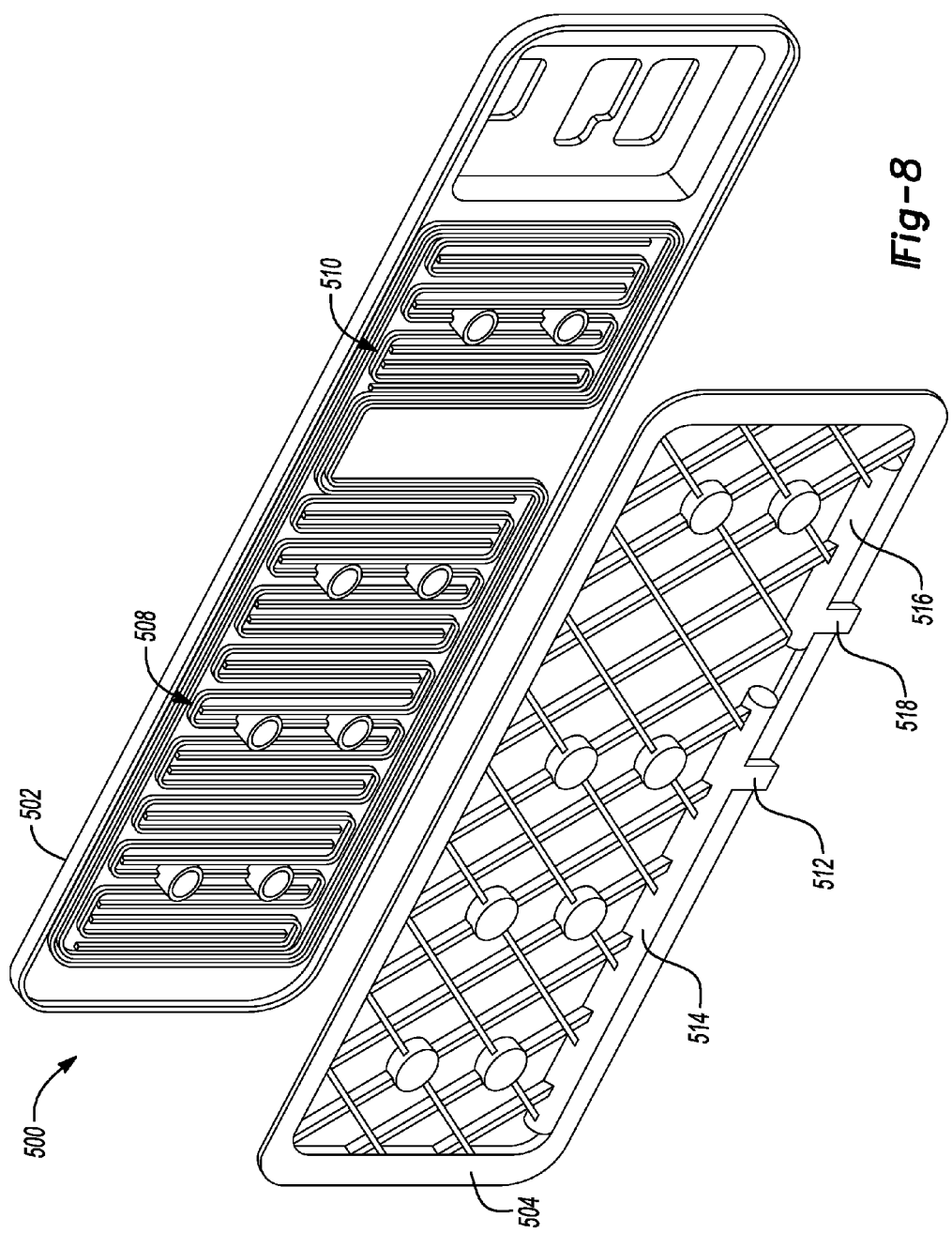
FIG. 8 is a perspective view of a battery cell array support structure.

FIG. 8 shows another example of an integration between a battery tray and a thermal plate. Battery support structure 500 may include an upper plate 502 and a lower plate 504. The upper plate 502 may define thermal plate structural features such as a first set of walls 508 with channels therebetween, and a second set of walls 510 with channels therebetween. These walls 508 and 510 may also assist in providing structural integrity to the battery support structure 500. The lower plate 504 may define thermal plate elements such as an inlet port 512, an inlet manifold 514, an outlet manifold 516, and an outlet port 518. The upper plate 502 and the lower plate 504 may, for example, be die cast using a high pressure die cast method. The upper plate 502 and the lower plate 504 may be attached to one another with fasteners and a gasket (not shown) sealed within the attachment. The upper plate 502 and lower plate 504 may also be welded or brazed to one another, in which case the fasteners may not be necessary. It is contemplated that other methods of attachment are possible. With each method of attachment, the upper plate 502 and the lower plate 504 are attached to one another such that a thermal fluid flow system, defined by the inlet manifold 514, the first set of walls 508, the second set of walls 510, and outlet manifold 516, provides a route for thermal fluid to flow proximate to a battery cell array (not shown) supported by the battery support structure 500. For example, the first set of walls 508 and the second set of walls 510 may contact and be attached the lower plate 504 such that channels defined between the walls 508 and 510 guide flow of the thermal fluid.

As described above, the battery support structure 400 and the battery support structure 500 may differ from typical battery tray structures, such as battery tray 98 from FIG. 2, which may include an upper portion, a lower portion, and one or more recesses to receive one or more thermal plates. Using an integrated design, such as battery support structure 400 or battery support structure 500, may provide advantages such as (i) a reduction in a number of parts used to support a battery cell array, (ii) a reduced tolerance stack up between the battery tray and battery cell array, (iii) a reduction in assembly complexity, (vi) a reduction in leak points, and (vii) eliminating a package tray or battery tray for the thermal plate and battery cell array to mount thereto. By having structural features on the upper plate and/or lower plate of the thermal plate, the thermal plate itself may function as a battery tray, and may be mounted directly to a chassis of the vehicle.

Figure 9A:
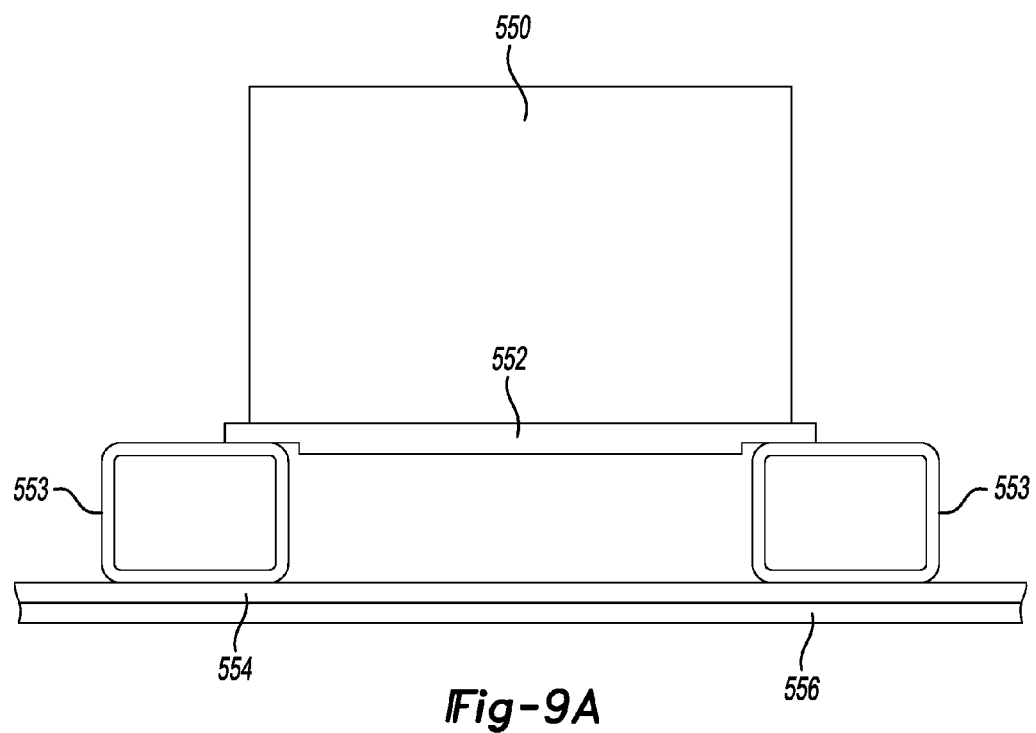
FIG. 9A is an illustrative view of a portion of a thermal management system mounted to a chassis.
Figure 9B:
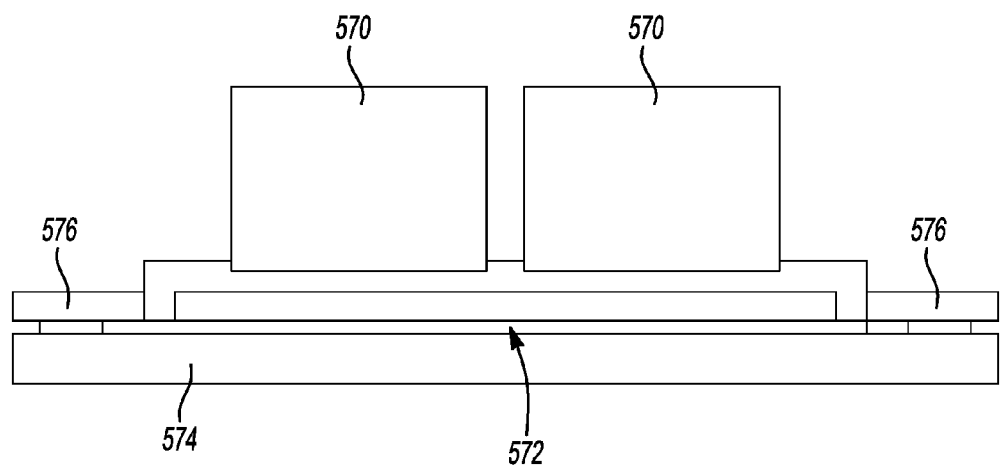
FIG. 9B is an illustrative view of a portion of a thermal management system mounted to a chassis.

For example, FIGS. 9A and 9B show an illustrative comparison between an integrated battery support structure, similar to the battery support structures 400 and 500, and a non-integrated battery support structure. In FIG. 9A, a battery cell array 550 is mounted to a thermal plate 552, which is mounted to a thermal plate support structure 553, which is mounted to a battery tray 554, which is mounted to a chassis 556 of a vehicle. In contrast and as described with battery support structures 400 and 500, FIG. 9B shows a battery cell array 570 mounted to a battery support structure 572 which may include a thermal plate. The battery support structure 572 may then be mounted to a chassis 574 of the vehicle at, for example, a set of brackets 576.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A traction battery comprising:
   a thermal plate to direct fluid therethrough and to support battery cells;
   an inlet manifold having an inlet located outside a region normal to a cross-sectional area of an outlet open to a heat exchange region of the plate defining spaced distribution channels arranged to disperse fluid across the outlet; and
   a rectangular trough disposed downstream of the channels and spanning between walls of the thermal plate.

2. The traction battery of claim 1, wherein the distribution channels are arranged in a plurality of fountain-type patterns extending from the inlet to the outlet and configured to influence fluid flow from a direction substantially perpendicular to a longitudinal axis of the thermal plate to a direction substantially parallel to the longitudinal axis of the thermal plate.

3. The traction battery of claim 1, wherein the distribution channels are configured to redirect fluid flow from the inlet in a direction substantially perpendicular to a longitudinal axis of the thermal plate to a direction substantially parallel with the longitudinal axis of the thermal plate.

4. The traction battery of claim 1, further comprising an outlet manifold in fluid communication with the heat exchange region, wherein the inlet manifold, thermal plate, outlet manifold, and a lower portion of a battery tray are die cast or stamped as a single component.

5. A traction battery system comprising:
   a plurality of battery cells;
   a thermal plate having a heat exchange region, lateral sides defining two planes, and configured to support the cells and to direct fluid through the thermal plate; and
   an inlet manifold including an inlet and an outlet in fluid communication with the heat exchange region and having a cross-sectional area defining a third plane, and defining spaced apart extrusions arranged in a plurality of curved fountain-type patterns extending from the manifold inlet to the outlet to disperse fluid across the outlet,
   wherein the two planes and third plane define a region normal to the cross sectional area and wherein the inlet is positioned outside of the region.

6. The system of claim 5, wherein the extrusions are arranged to redirect fluid flow from the manifold inlet in a direction substantially perpendicular to a longitudinal axis of the thermal plate to a direction substantially parallel with the longitudinal axis of the thermal plate.

7. The system of claim 5, further comprising an outlet manifold in fluid communication with the heat exchange region, wherein the inlet manifold, thermal plate, outlet manifold, and a lower portion of a battery tray are die cast or stamped as a single component.

8. The system of claim 5, wherein the thermal plate further defines a trough downstream of the inlet manifold outlet and configured to receive fluid from the outlet.

9. A traction battery system comprising:
a plurality of battery cells;
a thermal plate having a heat exchange region, lateral sides defining two planes, and configured to support the cells and to direct fluid through the thermal plate; and
an inlet manifold including an inlet and an outlet in fluid communication with the heat exchange region and having a cross-sectional area defining a third plane, and fluid distribution channels defined by passageways spaced apart from one another and arranged in an arc-like pattern to continuously extend from the manifold inlet to the outlet to disperse fluid across the outlet, wherein the two planes and third plane define a region normal to the cross sectional area and wherein the inlet is positioned outside of the region.

10. The system of claim 9, wherein the passageways further define passageway outlets spaced across a width of the inlet manifold outlet.

11. The system of claim 9, wherein the passageways are configured to redirect fluid flow from the manifold inlet in a direction substantially perpendicular to a longitudinal axis of the thermal plate to a direction substantially parallel with the longitudinal axis of the thermal plate.

12. The system of claim 9, further comprising an outlet manifold in fluid communication with the heat exchange region, wherein the inlet manifold, thermal plate, outlet manifold, and a lower portion of a battery tray are die cast or stamped as a single component.

13. The system of claim 9, wherein the thermal plate further defines a trough downstream of the inlet manifold outlet and configured to receive fluid from the outlet.

* * * * *